H. G. FARR.
SPRING FOR SUPPORTING RADIATORS.
APPLICATION FILED DEC. 16, 1911.
1,049,294.
Patented Dec. 31, 1912.
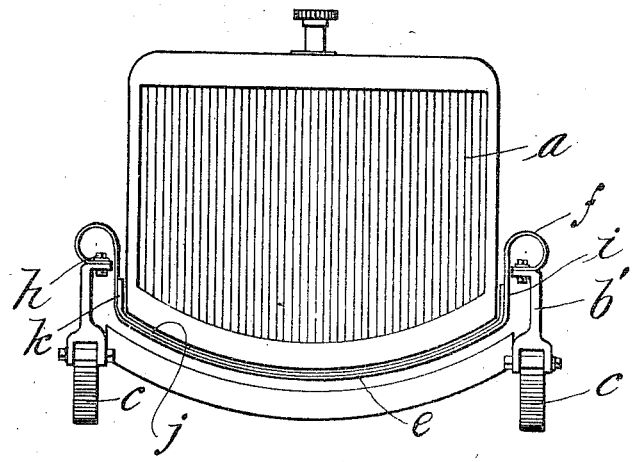
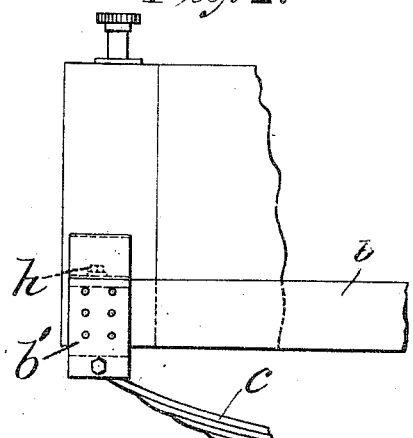
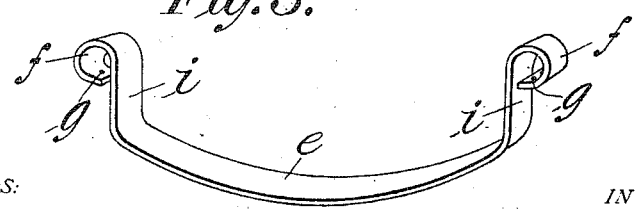
WITNESSES:
INVENTOR,
Herman G. Farr,
BY
Chapin & Co.
ATTORNEY.

UNITED STATES PATENT OFFICE.

HERMAN G. FARR, OF SPRINGFIELD, MASSACHUSETTS, ASSIGNOR TO KNOX AUTO-
MOBILE COMPANY, OF SPRINGFIELD, MASSACHUSETTS, A CORPORATION OF MAS-
SACHUSETTS.

SPRING FOR SUPPORTING RADIATORS.

1,049,294.  Specification of Letters Patent.  Patented Dec. 31, 1912.

Application filed December 16, 1911. Serial No. 666,168.

*To all whom it may concern:*

Be it known that I, HERMAN G. FARR, a citizen of the United States of America, residing at Springfield, in the county of Hampden and State of Massachusetts, have invented new and useful Improvements in Springs for Supporting Radiators, of which the following is a specification.

This invention relates to improvements in springs for supporting the forward end of radiators on water-cooled automobiles. Heretofore it has been the common practice to rigidly support the radiators, or to form a rigid connection between the same and the frame or chassis part of the machine with the result that leakage more often occurs in the radiator on account of this rigid connection.

My invention has for its particular object to overcome this liability of the radiator to leak and to permit the radiator to have free movement to a large extent both vertically and transversely of the machine.

This invention is especially adapted for use in connection with heavy trucks where there is considerable vibration and movement of the chassis on account of the heavy loads carried, requiring a great deal of motive power to propel the load.

The invention consists, broadly, of a one-piece spring having a coil at its opposite ends for attachment to the frame of the machine, the spring being located under the forward end of the radiator, and so formed and hung as to permit the forward end of the radiator to move in both the vertical and horizontal planes or in a path that is component of these two planes.

In the drawings forming part of this application,—Figure 1 is a front elevation of the forward end of the radiator showing the spring in place and attached at its opposite ends to the frame of the machine. Fig. 2 is a side elevation of Fig. 1. Fig. 3 is a detailed, perspective view of the spring detached from the framework.

Referring to the drawings in detail, the radiator, as a whole, is designated by the letter *a*; *b* designates the forward part of the chassis or framework of the machine; *c* designates a spring of the leaf type which is attached to the forward part *b* of the chassis frame by means of a pin *d* and which extends rearwardly to the front axle of the machine in the usual manner and to which it is attached; *e* designates the supporting downwardly curved portion of the one-piece spring which is provided at its opposite ends with the coiled or bent integral portions *f* having the perforations *g* near their ends for attachment to the hanger part *b'*, as shown, by means of bolts *h*. This spring extends transversely of the machine and with the portion between the uprights *i* lying under the forward part of the radiator. The uprights or arm portions *i* of the spring permit the radiator to move or oscillate freely from side to side, or in a transverse direction, and the coiled or bent portion *f* permits the radiator to move vertically of the frame.

Located immediately below the radiator and above the bent portion *e* of the spring is a strip *j* on which the radiator directly rests, or it is an inserted strip between the radiator and the spring. This insert strip has an upwardly extending portion at its ends, as shown at *k*, and is secured either to the spring *e* or to the radiator *a* in any suitable manner.

By means of this construction it will be seen that the improvement in the supporting spring for the forward end of the radiator permits the same to move either transversely or vertically, and thus absorbs all of the shocks to which the radiator is subjected, thereby overcoming the danger of leakage caused by the rigid connections heretofore in use. By means of this construction the forward end of the radiator *a* is furnished with a double spring cushion support by means of the use of the spring *e*, and the one that is located under immediately supports the forward end of the radiator. Heretofore it has been the common practice to leave the forward end of the radiator unsupported with the result that it was found to be next to impossible to prevent the radiator from leaking which was caused by the shocks and jars to which the radiator was subjected. This is particularly true of heavy trucks which are employed to convey large loads over rough ground. My improved spring support effectively overcomes this objection of constant leakage. The use of a one-piece spring located under the front end of the radiator permits this part of the radiator to be thoroughly cushioned, both vertically and horizontally.

What I claim, is:—

1. A one piece spring for supporting the forward end of radiators, comprising a supporting portion proper on which the radiator is adapted to rest, and upwardly extending portions to provide a transverse movement for the radiator, and coiled end portions for attaching the spring to a suitable support to permit the radiator to move vertically, substantially as described.

2. An improvement in spring-supporting devices for automobile radiators, comprising a one-piece spring having coiled end portions for attachment to a suitable support, and vertically extending portions integral with the coiled end portions, and the member on which the radiator rests which connects the vertically extending portions being integral with said portions, whereby the forward end of a radiator may be permitted to move both vertically and transversely.

3. An improvement in spring-supporting devices for automobile radiators, comprising a one-piece spring having coiled end portions for attachment to a suitable support, and vertically extending portions integral with the coiled end portions, and the member on which the radiator rests which connects the vertically extending portions being integral with said portions whereby the forward end of a radiator may be permitted to move both vertically and transversely, and an insert member between the radiator supporting portion of the spring and the radiator.

HERMAN G. FARR.

Witnesses:
    HARRY W. BOWEN,
    FRANKLIN G. NEAL.